J. B. HARRISON.
VEHICLE CHOCK.
APPLICATION FILED OCT. 28, 1911.
1,047,048.
Patented Dec. 10, 1912.
2 SHEETS—SHEET 1.
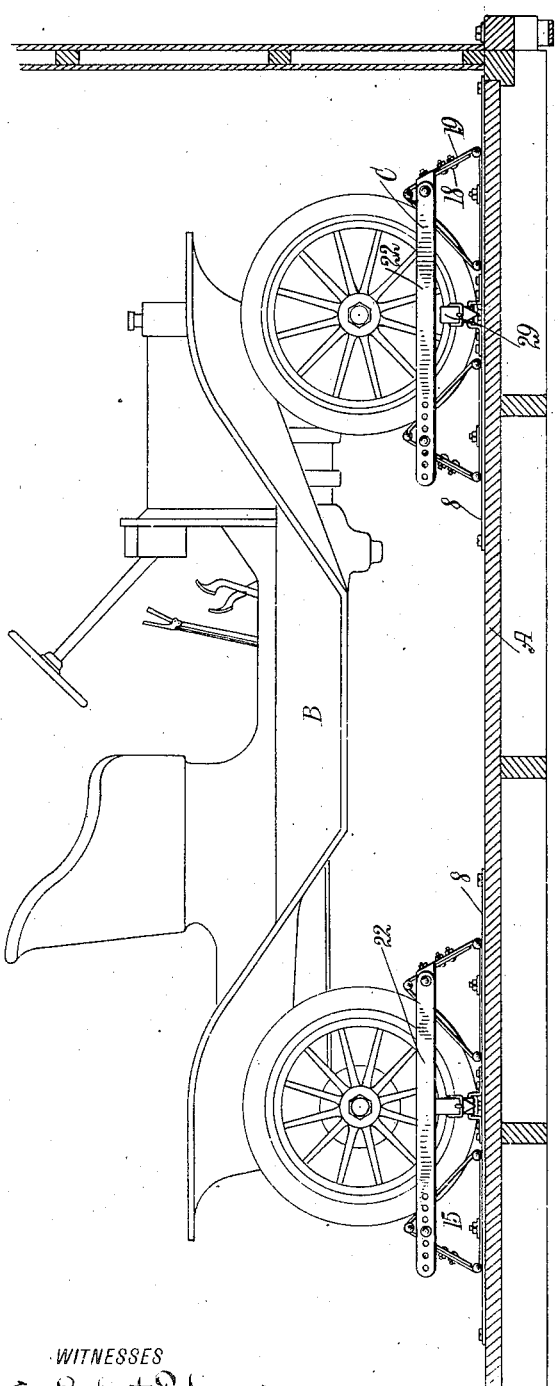
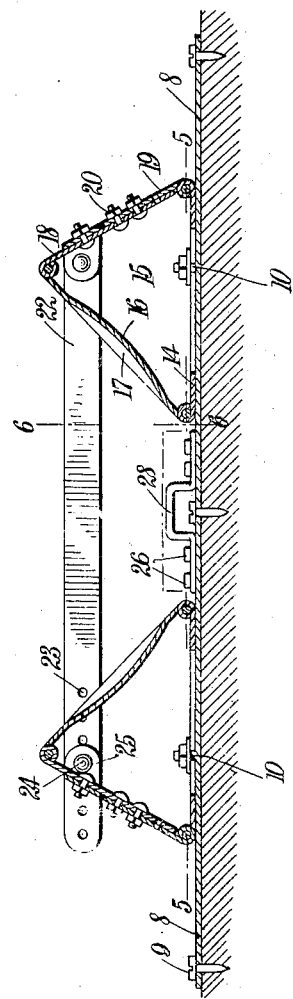
WITNESSES
G. Robert Thomas
W. J. Orton
INVENTOR
James B. Harrison
BY Munn & Co
ATTORNEYS J. B. HARRISON.
VEHICLE CHOCK.
APPLICATION FILED OCT. 28, 1911.
1,047,048.
Patented Dec. 10, 1912.
2 SHEETS—SHEET 2.
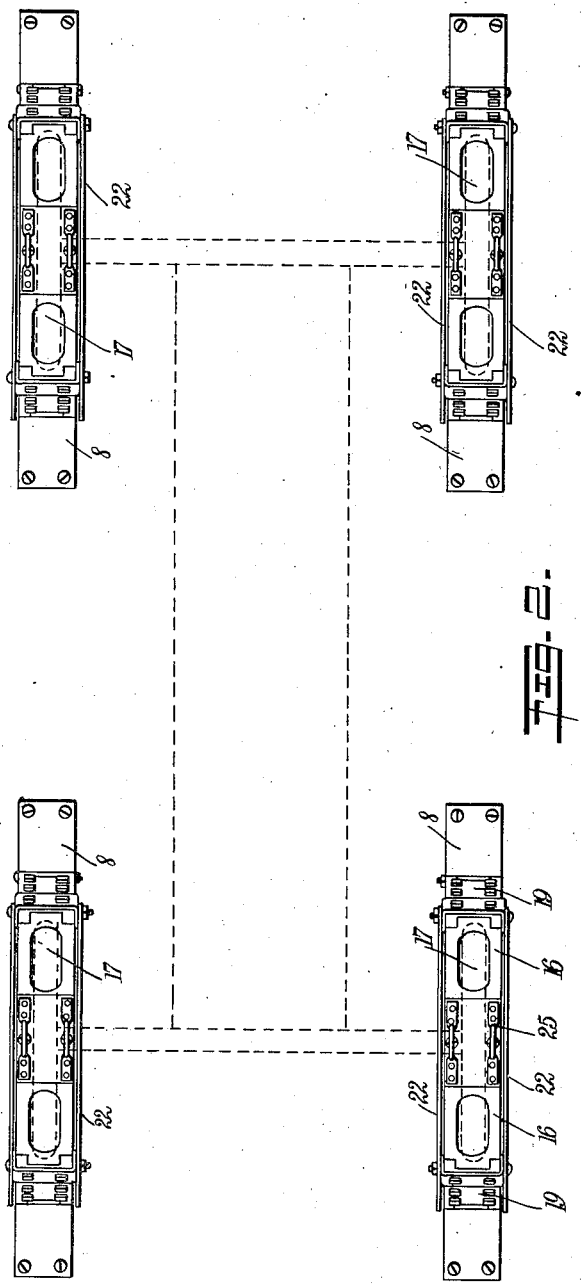
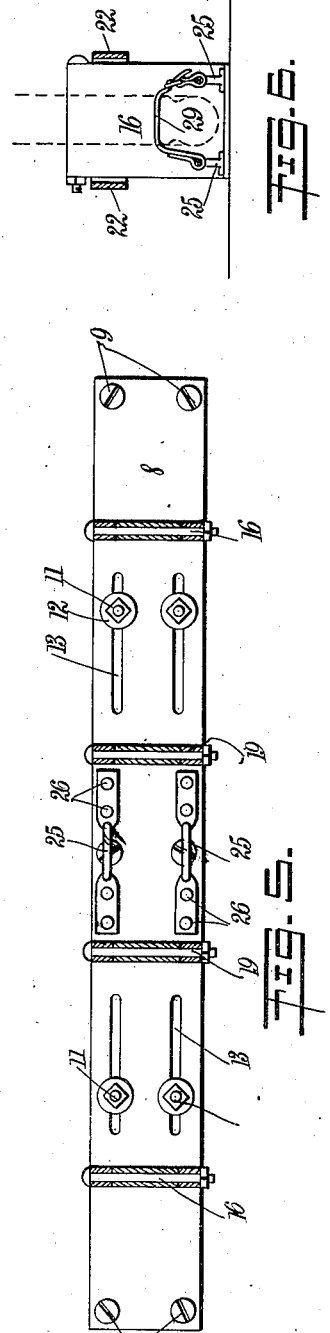
WITNESSES
INVENTOR
James B. Harrison
BY
ATTORNEYS

UNITED STATES PATENT OFFICE.

JAMES BUXTON HARRISON, OF PORTLAND, OREGON.

VEHICLE-CHOCK.

1,047,048.

Specification of Letters Patent.

Patented Dec. 10, 1912.

Application filed October 28, 1911. Serial No. 657,290.

*To all whom it may concern:*

Be it known that I, JAMES B. HARRISON, a citizen of the United States, and a resident of Portland, in the county of Multnomah and State of Oregon, have invented a new and Improved Vehicle-Chock, of which the following is a full, clear, and exact description.

My invention relates to a means for holding a vehicle on a platform, and more particularly relates to a means for fastening an automobile on a box car.

An object of my invention is to provide a holding device which may be adjusted to fit different-sized wheels, and to fit the sets of wheels disposed at different distances apart.

Reference is to be had to the accompanying drawings forming a part of this specification, in which similar characters of reference indicate corresponding parts in all the views, and in which—

Figure 1 is a side elevation of an automobile mounted in a box car by means of a preferred embodiment of my invention; Fig. 2 is a plan view, looking down on the floor of the car, with the vehicle removed; Fig. 3 is a side elevation of one of the holding means; Fig. 4 is an end view of the same; Fig. 5 is a transverse sectional view taken on the line 5—5 of Fig. 3; and looking down; and Fig. 6 is a view taken on the line 6—6 of Fig. 3, showing the binding straps in position.

Mounted upon a platform or floor of a box car A, is shown an automobile B, fastened to the platform by means of fastening devices C, one fastening device being disposed beneath each wheel, as shown more particularly in Fig. 2, said fastening devices forming the subject-matter of this invention. While one or more of these fastening devices will be shown, it is, of course, to be understood that they are similar in construction, for engagement with each wheel.

Each fastening device comprises a bed-plate 8, fastened to the floor by any suitable means, as by means of screws 9 at each end, as shown in Fig. 5. Extending upward from adjacent opposite ends of the plate 8 are a pair of transversely-disposed bolts 10, the upper end of each of which bolts has a nut 11, disposed below which is a washer 12, said nuts passing through a pair of longitudinally-disposed slots 13 in a bottom plate 14 of a wheel-clamping member 15. By this construction, the pair of wheel-clamping members on each of the bed-plates 8 may be adjusted to firmly engage different-sized wheels in front and rear of its lower point, where it rests on the platform. These wheel-clamping members are similar in construction, merely being reversed in position, and comprise three plates arranged in the form of a triangle, with the bottom plate 14, as hereinbefore described, resting on the bed-plate 8, and pivoted at opposite ends of said bottom plate is a wheel-engaging plate 16 having a dished face 17 adapted to center the tire of the wheel. Pivoted to the upper end of this dished plate is a supporting plate 18, adapted to lie flat against a similarly-constructed supporting plate 19 pivoted to the end of the bottom plate 14 opposite the connection of the plate 16 with said bottom plate. The plates 18 and 19 are removably fastened together by means of bolts 20 passing through one set of alined apertures 21 in the plates 18 and 19.

It will be seen by this construction that the plates 18 and 19 may be adjusted to a position engaging the outer circumference of the rim of the wheel; that is, the smaller the diameter of the wheel, the more perpendicular will be positioned the plate 16. In order to fasten the wheel-clamping members 15 of each pair together, there is pivoted to opposite sides of one of said members a pair of horizontally-extending straps 22, the free end of each strap having a number of apertures 23 extending therethrough. One of these apertures in each strap is engaged by a bolt 24 passing therethrough and through an ear 25 extending from opposite sides of the other of said members 15, as shown more particularly in Fig. 3. Centrally disposed between the members 15 of each pair are a pair of transversely-disposed straps 28, rigidly fastened to the bed-plate 8 by means of rivets 26, as shown more particularly in Fig. 5. The wheel is adapted to rest between these straps, and a leather strap 29 is passed over the felly of the wheel and about the centrally-raised portions of the straps 28, thereby firmly binding the wheel to the bed-plate 8.

Having thus described my invention, I claim as new and desire to secure by Letters Patent:—

1. A wheel-engaging means of a general triangular construction, comprising a bottom plate, a dished wheel-engaging plate pivotally mounted on said bottom plate, the third side of said means comprising two superimposed plates, one plate pivoted to the bottom plate and the other of said plates pivoted to the wheel-engaging plate, and means adjustably fastening said plates together.

2. A wheel-engaging means of a general triangular construction, comprising a bottom plate, a dished wheel-engaging plate pivotally mounted on said bottom plate, the third side of said means comprising two superimposed plates, one plate pivoted to the bottom plate and the other of said plates pivoted to the wheel-engaging plate, means adjustably fastening said plates together, and means carried by one of said superimposed plates adapted to permit of a variable connection with another of said wheel-engaging plates.

3. In a means for holding a wheel on a platform, a bed-plate mounted on said platform, and a pair of spaced-apart triangular shaped members adapted to be positioned in front and rear of the wheel, the sides of each triangular shaped member being pivotally connected together, and one side consisting of two sections adjustable relative to each other for varying the angular disposition of said triangular shaped member to fit wheels of different diameters.

4. In a means for fastening a wheel to a platform, a bed plate, and a pair of wheel engaging devices, each comprising a bottom plate, a wheel-engaging plate pivoted at its lower end to the inner end of the bottom plate, and two plates adjustably connected together, one of said plates being pivoted to the other end of the bottom plate, and the other of said plates being pivoted to the upper end of the wheel-engaging plate, the said bottom plates being each adjustably mounted on the bed plate, whereby said wheel-engaging plates may be positioned in front and rear of different sized wheels.

5. In a means for fastening a wheel to a platform, a bed plate, a pair of triangular-shaped wheel engaging devices each comprising a bottom plate, a wheel engaging plate pivoted at its lower end to one end of the bottom plate, two supporting plates adjustable relative to each other, one of said supporting plates being pivoted to the other end of the bottom plate, and the other supporting plate being pivoted to the upper end of the wheel engaging plate, means for fastening the supporting plates together when adjusted, the said bottom plate being adjustably mounted on the bed plate to permit of moving the wheel engaging devices toward and from each other, means for binding the wheel to the bed plate, and means for fastening the wheel engaging devices together.

In testimony whereof I have signed my name to this specification in the presence of two subscribing witnesses.

JAMES BUXTON HARRISON.

Witnesses:
C. M. IDLEMAN,
ARTHUR J. GANTLER.